Figure 3:
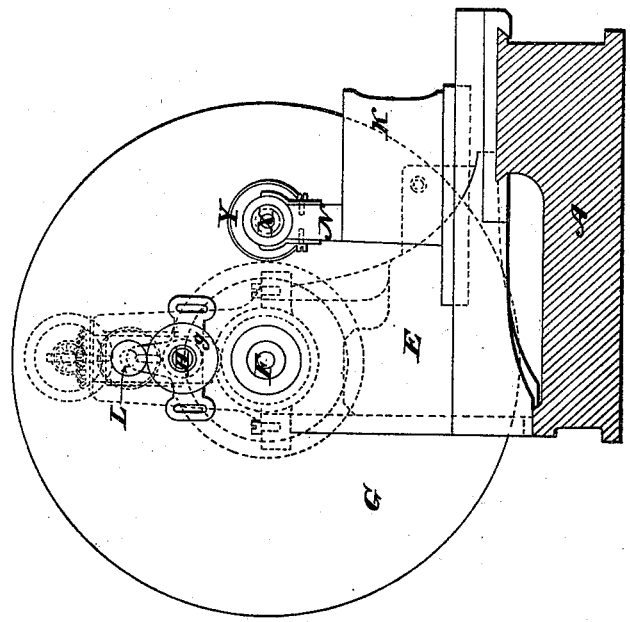

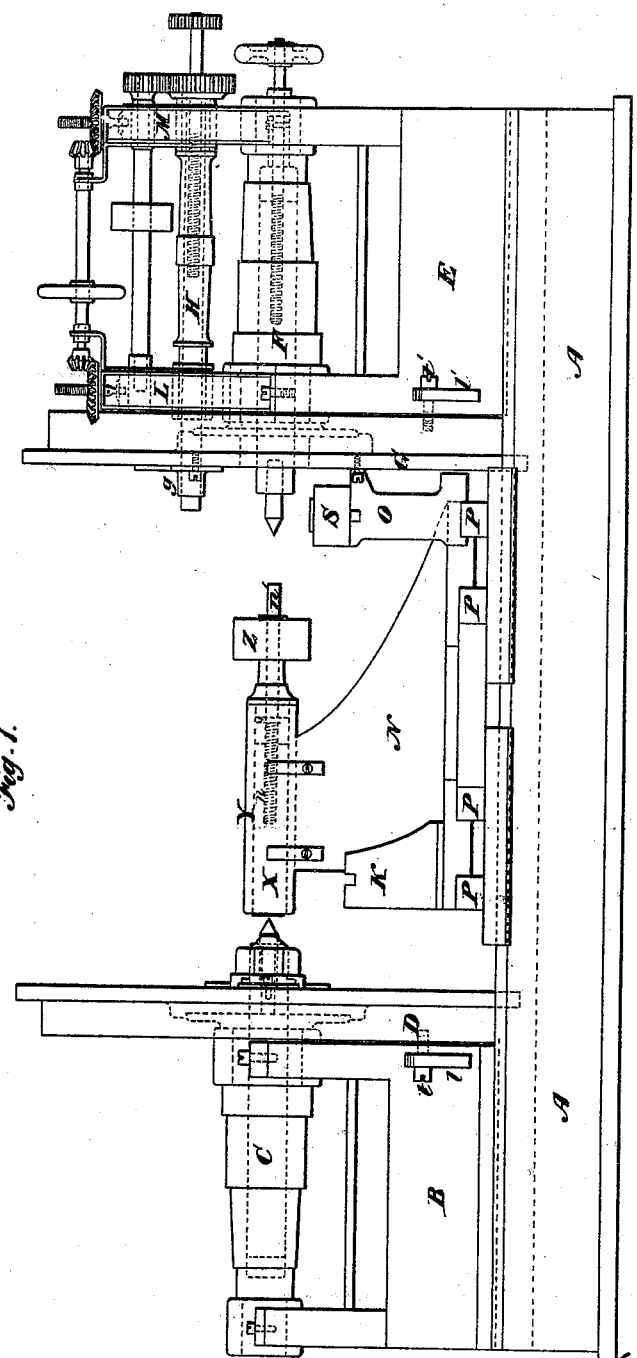

H. D. Stover.
Lathe.
No. 91,788. Patented Nov. 22, 1869.

Witnesses.

Inventor
H. D. Stover

United States Patent Office.

HENRY D. STOVER, OF NEW YORK, N. Y.

*Letters Patent No. 91,788, dated June 22, 1869.*

---

IMPROVED LATHE FOR FINISHING THE DRIVING-WHEELS OF LOCOMOTIVES.

---

The Schedule referred to in these Letters Patent and making part of the same.

---

*Know all men by these presents:*

That I, HENRY D. STOVER, of the city, county, and State of New York, have invented a new and useful Improvement in Lathes for Finishing and Repairing the Driving-Wheels of Locomotives, and for other similar devices, whereby much time and labor are saved in boring, "splining," or cutting the key-seat, and facing the hubs and tread of the wheels, boring for the crank-pins, &c., greater accuracy being secured in accomplishing the work, besides saving the expense of the most skilful operatives.

My invention relates chiefly to the combination of certain devices with the ordinary driving-wheel lathe, by which, while the wheel is being bored to receive the shaft, the inner end of the hub may be faced or "trued up," by a tool for that purpose; and as soon as the two operations are completed, another device is introduced, which "splines" or forms the key-seat before the wheel is shifted from the face-plate.

Again, while the wheels are mounted upon the axle and centred in the lathe, the outer face of one may be "finished," while the tread or tire of the other is being turned off.

And lastly, by means of a boring-apparatus, in combination with such a lathe, I am enabled to bore the holes for the crank-pins accurately in their places, either to the right or left, and from the outside of the wheel, thereby overcoming the difficulty heretofore experienced, when boring from the inside, of making the hole slightly tapering in the wrong direction, in consequence of the wear of the tool; but by boring from the outside, the hole, if tapering, has the taper in the right direction for driving in the crank-pin.

That others may understand the nature of my invention, I will now proceed to explain the devices more fully; and I do hereby declare that the following is a true and exact description of the same, reference being had to the accompanying drawings, making a part of this specification, and to the letters of reference marked thereon, so that those skilled in the art may make and use my invention.

Like letters represent like parts in the several figures.

In the drawings—

Figure 2:
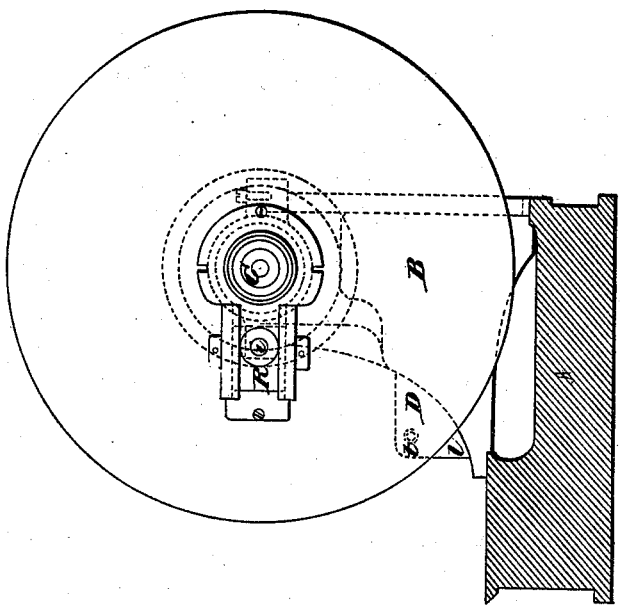

Figure 1 represents a front elevation of my lathe;

Figure 2, the inner face of the head face-plate, showing the device for quartering or locating the crank-pins, &c.; whilst Figure 3 represents the inner face of the tail-plate, with devices for boring the holes for the crank-pins, &c.

A is the "bed" or foundation-frame of the lathe.

B, the "head" or support for holding the driving-gear, mandrel C, and face-plate D.

E is the support for the tail-stock or centre F and face-plate G, and shows my improvements for supporting the boring-apparatus H, L, M, &c.

N is a temporary tool-rest, for supporting the tools for facing off the inner end of the hub, having a bracket, K, at right angles to it, to hold a tool, and it also supports a sleeve, Y, inside of which is the boring-mandrel X, and this sleeve also holds the tool for cutting the key-seat.

O is a temporary rest, for holding a tool to face off the outer end of the hub of one of the wheels, when they are mounted upon their axle, supporting the tool in the stock S between the face-plate G and the outer face of the wheel to be turned. This tool, with its stock, can be transferred to the bracket K, to face the inner end of a hub there before the wheel is put on an axle; or after it performs such labor first, it is more properly transferred to O, to finish the outside of a hub, as will be more fully detailed hereafter.

P P are transverse guides, resting upon the bed A, which serve to support the rests for the tool-stocks.

The frame A, head and tail-stocks B and E, with their mandrels and face-plates C and D, F and G, are all constructed in the usual style of such lathes, and I use the ordinary rest and tool-stock, with automatic feed-motion, for turning off the tires of the wheels.

H represents the boring-mandrel, mounted in sliding boxes L and M, and capable of being moved to and from the lathe-centres by screws, or other convenient mechanism.

The operation of my machine may be described in successive detail, as follows:

A wheel is first properly secured, in the usual manner, to the face-plate D, the outer end of the hub being against or near the plate. Motion is communicated through the mandrel C. A boring tool is held firmly in the mandrel X, which slides in the sleeve Y at the upper part of the rest N, and this tool is moved up to its work, or back from it, by means of a screw, $n$, through any suitable hand-clutch, attached at $n'$. Whilst this boring is being done, the facing of the inner end of the hub is also going on by means of a tool, secured in a stock like S, but supported upon the bracket K.

The next operation being to cut the key-seat, the face-plate D is held fast securely by means of a screw-stop, $t$, or equivalent device, passing through a bracket or projection, $l$, on head-rest B. A slotting-tool is then introduced into X, where the boring-tool was, and this is pushed forward by means of the screw $n$, driven by a belt on the pulley Z, said belt passing over a counter-shaft above, which is provided with suitable direct and reverse motion. The mandrel X is thus converted into a slotting-tool.

It is thus shown, by the arrangement just described, how a wheel may be bored, the inner end of hub faced, and the key-seat formed, without changing the position of the wheel attached to the face-plate, all, as it were, at one operation, which may be called the first.

The work on two drivers being thus far done, they are mounted upon their axle, and it is centred in the lathe between C and F, the rest N, with its attachments, being removed. Through C, motion is given to the axle, and its wheels secured to the same. Whilst an ordinary tool-stock is put in position, and properly operated, to turn off the tire of the wheel near the face-plate D, the tool in stock S, on rest O, between the other wheel and face-plate, is applied to face the outer end of the hub of the wheel nearest G, or that part of the hub next to it. During this operation, the rest O is securely fastened to the tail-plate G, and G is prevented from turning, by being held firmly like D was, when the wheel on it was being slotted for the key-seat, that is, by means of a bolt or screw, $t'$, passing through a bracket, $l'$, a part of tail-stock E.

The next operation is that of boring out the holes for the crank-pins—an important feature of my invention. The wheel to be bored is first turned until the point through which the pin is to be fixed, comes opposite to, or in a vertical line with the mandrel H, and where it is held securely. The mandrel H passes through a sleeve, $g$, having three slotted arms as guides, for raising or lowering it, and it is attached to the face-plate G by screws, as seen in fig. 1. The mandrel in the sliding boxes L M is raised or lowered to its proper position by means of a hand-wheel and suitable gearing, as seen in fig. 1.

Motion is now communicated to the boring-tool held in H, by any convenient mechanism, which I have mounted upon the same sliding boxes, as seen; and this tool is fed forward by a screw, or any of the well-known devices for operating such tools. It is retracted by a reverse motion of the same device.

In this manner the hole for the crank-pins is bored from the outside, and any wearing away of the tool will only serve to make a tapering hole, which will bind the pin, the more it is driven.

The next operation is to reverse the axle and wheels between the centres, and bring the hole already bored for the crank-pin in one wheel to the stud or sliding bolt $i$, which projects from a plate, R, bolted to face-plate D, this plate being so formed as to hold the stud, permitting it to be slid to or from the centre. This stud is so adjusted as to be in an axial line, ninety degrees from the vertical axial one, or that in which the mandrel H and its boring-tool was. The stud $i$ being inserted in the crank-pin hole just bored, serves as a gauge, and will hold the wheels while the other hole is being bored in the opposite wheel, as has just been explained; but before doing this, the periphery or tire of the wheel nearest D may be turned, whilst the outer end of the hub nearest G is being faced.

It will thus be seen that whilst a single wheel is secured to face-plate D, its hub is bored, one end faced, and the key-seat cut before being removed. Two wheels being then secured on an axle, and it centred in the lathe, the outer end of one hub is being faced, whilst the tire of the other is being faced. Next, one of these wheels, whilst still held between the centres, is bored for the crank-pins. The wheels are then reversed between the centres, the boring and the facing of the outer end of the other hub, and the turning of the tire of the other wheel completed. Thus, many operations are performed at the expense of very few changes.

Having thus described my invention,

What I claim, and desire to secure by Letters Patent, is—

1. The combination of the boring-mandrel H with the double face-plate lathe, as described, in the manner substantially as shown.

2. The combination of the tool-rests K and O with the double face-plate lathe, substantially in the manner described.

3. In combination with such lathes, the tool-rest N, mandrel X, and screw $n$, substantially as described, and for the purposes set forth.

4. The arrangement of the tool-rest O, between the face-plate G and the wheel to be operated on, in the manner and for the purpose substantially as described.

5. In combination with the double face-plate lathe, the brackets $l\ l'$ and studs or stops $t\ t'$, substantially as described.

6. In combination with the double face-plate lathe, the rests K and N and the slotting and boring-device thereon, substantially as described.

7. The adjustable stud or bolt $i$ and the adjustable bracket R, when combined with the double face-plate lathe, substantially as described, and for the purposes set forth.

8. The adjustable sleeve $g$ and the boring-tool H, in combination with the tail face-plate of the lathe, substantially as described, and for the purposes set forth.

H. D. STOVER.

Witnesses:
J. BOYD ELIOTT,
GEORGE H. RHODES.